Jan. 30, 1962
W. I. JONES
3,019,152
APPARATUS FOR APPLYING SNAP FASTENER ELEMENTS TO SUPPORTING MATERIALS
Filed April 29, 1957
2 Sheets-Sheet 1
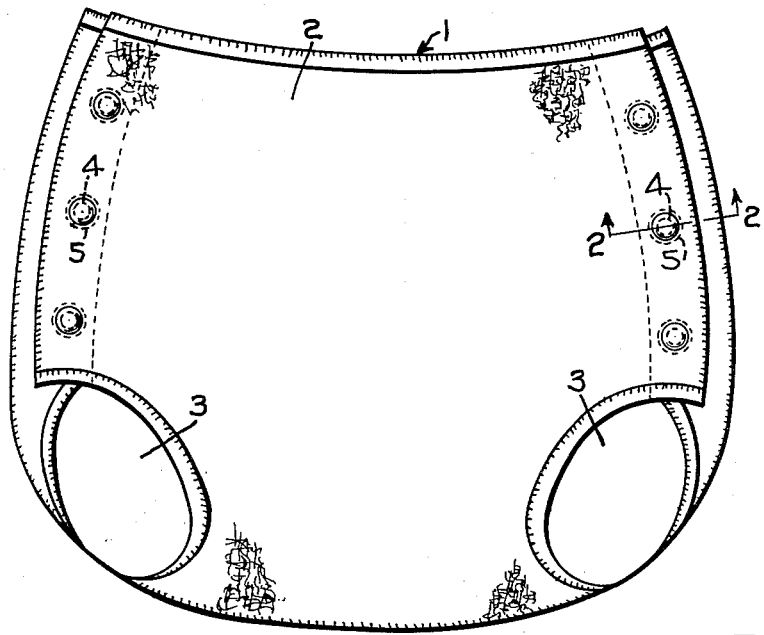
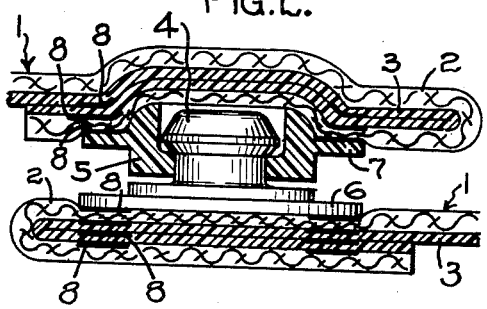
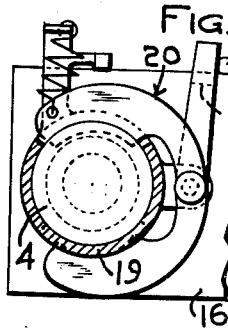
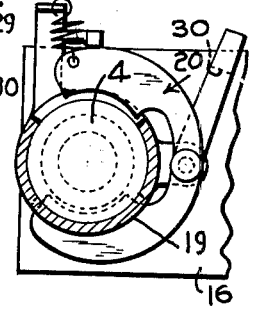
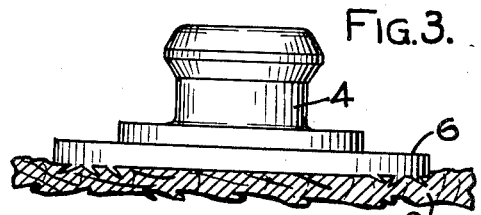
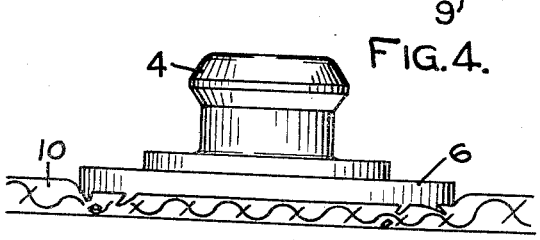
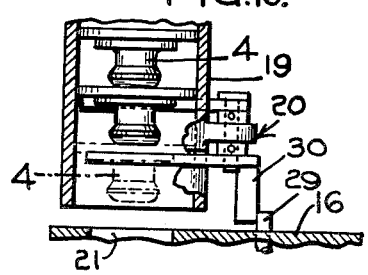
INVENTOR:
WALTER I. JONES,
BY Philip E. Parker
ATTORNEY.

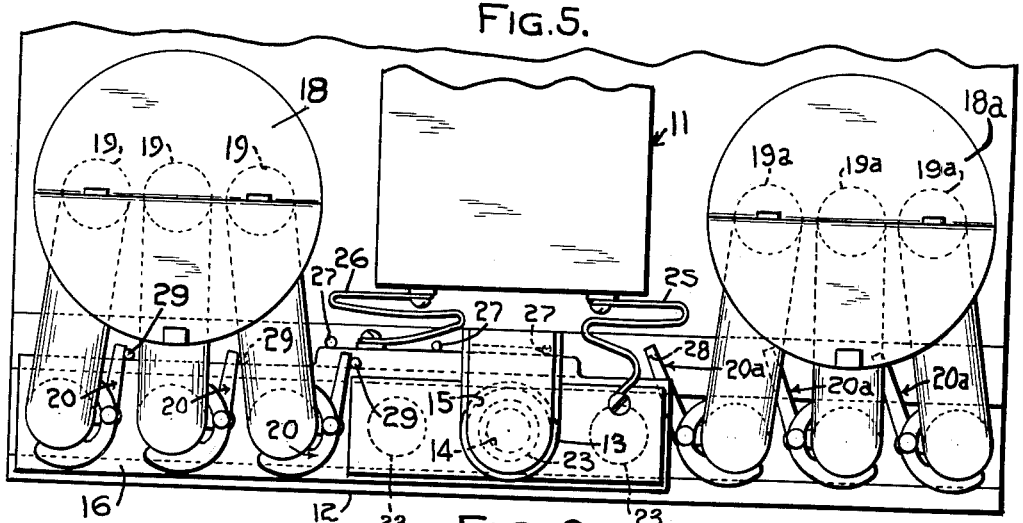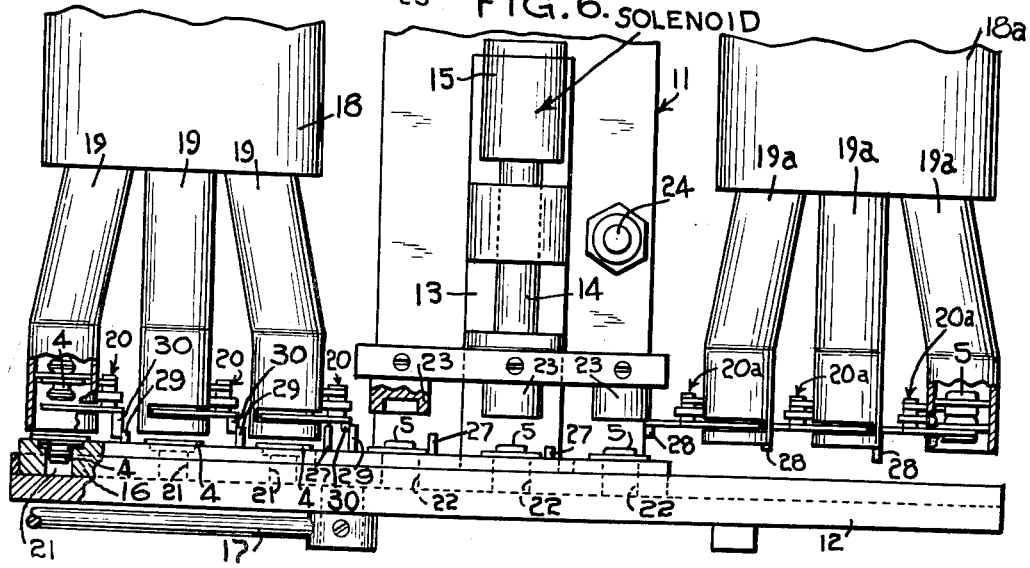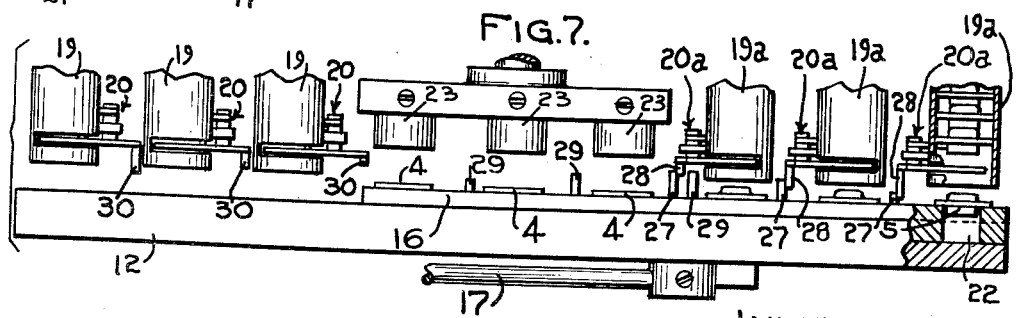

United States Patent Office 3,019,152
Patented Jan. 30, 1962

3,019,152
APPARATUS FOR APPLYING SNAP FASTENER ELEMENTS TO SUPPORTING MATERIALS
Walter I. Jones, Belmont, Mass., assignor to United-Carr Fastener Corporation, Boston, Mass., a corporation of Delaware
Filed Apr. 29, 1957, Ser. No. 655,921
4 Claims. (Cl. 156—380)

My invention aims to provide improvements in methods of assembling fastener assemblies which include various materials such as textiles, plastics, wood, leather, and the like to which snap fastener studs or sockets may be fused preferably by high frequency alternating current energy such as high frequency dielectric heating. It also aims to provide improvements in equipment for attaching the fasteners to the supporting materials as well as the method of assembling the parts involved.

Reference is hereby made to my divisional application Serial No. 696,201, filed November 13, 1957.

An object of my invention is to provide equipment for fusing the devices in question, either singly or plurally, and either a snap fastener stud or studs or a snap fastener socket or sockets by means of a single unit of equipment.

A further object of my invention is involved in the method of attaching my improved fasteners to various materials to which the fasteners may be fused by new methods heretofore not known to those skilled in the art.

Referring now to the drawings which illustrate my invention:

FIG. 1 is a front elevational view of a baby pants showing one combination and use of my invention;

FIG. 2 is an enlarged section on the line 2—2 of FIG. 1 showing the stud member of the snap fastener in elevation;

FIG. 3 is an enlarged elevation of a stud member showing the method of assembly by fusion of the material of the stud to wood, leather or the like shown in cross section;

FIG. 4 is a view similar to FIG. 3 showing the fastener stud fused to textile or similar material;

FIG. 5 is a plan view of the essential portions of an apparatus or device for attaching my plastic snap fastener members to various supporting materials;

FIG. 6 is a front view of the apparatus shown in FIG. 5 showing various of the operative parts in one position of the apparatus and showing some portions in section;

FIG. 7 is a front view of the lower portion of the apparatus shown in FIG. 6 and showing the various parts in another portion;

FIG. 8 is a plan section of one view of an escape mechanism for feeding a snap fastener part;

FIG. 9 is a view similar to FIG. 8 but showing another portion of the escape mechanism; and FIG. 10 is a sectional elevation of a portion of a fastener carrying slide and the escape mechanism shown in FIGS. 8 and 9.

My invention as illustrated by the drawings relates particularly to a mechanism for applying so-called snap fasteners to various types of material, more particularly material that has pores in its construction or pores or openings formed in the material for the purpose. It also relates to the method of applying the fasteners to various existing structures having pores, holes, spaces and the like as against the method of applying to sheet plastics and similar materials that have no pores or gripping spaces.

In FIG. 1 I have illustrated how it would be used in connection with baby pants 1 formed from a combination of woven material 2 and plastic sheets 3 as best shown in cross section in FIG. 2. In connection with this specific garment I have shown a snap fastener stud 4 and socket 5 (FIG. 2) formed of plastic and more particularly plastic now well known as vinyl plastic. Other suitable plastic materials that may be fused electronically also may be used.

By the use of my improved method and apparatus hereinafter described, the stud 4 and socket 5 are dielectrically heat sealed to the folded edge of the baby pants 1 (FIG. 2) at their base flanges 6 and 7, and the layers of fabric and plastic are sealed to each other as shown by the solid areas 8.

In order to show other applications of my invention, I have illustrated a stud 4 fused at base flange 6 to the pores provided in a piece of leather supporting structure 9 as best illustrated in FIG. 3.

The same type application of a stud 4 to cloth 10 (or textile material) may be accomplished by electronically fusing the flange 6 to the spaces presented between the threads of the textile as best shown in FIG. 4.

The studs 4 and sockets 5 may be of any suitable shape, but preferably they should have laterally extending flanges 6 and 7 that are easily oriented by the applying machine. Therefore, it is not necessary to describe the shape and the detail construction of these snap fastener parts.

My resulting combinations of fasteners and supporting structures is such that articles of manufacture, requiring fasteners for closures, may be made without the use of sewing of the folds or the use of separate attaching elements for the fasteners as has been necessary to do when metal fasteners have been used on the same articles of manufacture.

While I am aware of the fact that my improved installation of fasteners may be accomplished by hand-operated tools, kick press-operated tools, and various more complicated pieces of machinery and electrical devices, I have shown a relatively simple unit for securing the desired result. My specific unit, illustrated in FIGS. 5 through 11 inclusive, comprises a suitable electronic unit 11 adapted to supply high frequency alternating current energy, such as high frequency dielectric heating, to a mechanical mechanism for applying the snap fastener part to a support. In conjunction with this unit 11, I have shown, in FIGS. 5, 6, and 7, a bedplate 12 and support 13. The support 13 holds a movable ram 14 operable by a solenoid 15, air cylinder or any other suitable power applying device. The bedplate 12 carries a transfer slide 16 movable back and forth under the ram 14 by an arm 17 moved by any suitable power applying device not shown.

As a part of the unit I have shown two fastener feeding mechanisms, each of which includes a hopper 18, tubes or chutes 19 and escape mechanisms 20 for transferring the fastener parts, one at a time, from the chutes 19 to the transfer slide 16.

These escape mechanisms 20 (FIGS. 9, 10, and 11) may be of any suitable construction as will be understood by those skilled in the art and therefore need not be described in detail.

It should be understood that I may apply fastener members one at a time or plurally by my improved fasteners attaching unit. Furthermore, I may apply only a socket or sockets or a stud or studs and/or both or in any desired sequence.

As an example of the operation of my improved apparatus or unit and the application of plastic snap fasteners to a baby pants 1, I will describe the operation of applying studs 4 and sockets 5 three at a time to the edges of an opening to be closed.

Assuming that there are studs 4 in the hopper 18 and sockets 5 in the hopper 18a and that the studs and sockets have passed down into the chute 19 and 19a and that the slide 16 is under the chutes 19, the escape mechanism 20 associated with these chutes 19 will load studs 4 into apertures 21 (left hand side of FIG. 6) in the slide 16, the attaching mechanism is then ready to operate. As will be seen by inspection of FIG. 6 three sockets 5 are already in position on the slide 16 in apertures 22 having previously been supplied from the chutes 19a and the escapements 20a. These sockets 5 are in the proper portions under three applying units 23 carried by the ram 14. Therefore, when the contact button 24 (FIG. 6) on the unit 11 is operated, the movable ram 14 will be pressed by the solenoid 15 against the material at the edge of the baby pants which has been inserted under the applying units 23. As the ram descends it will force the material of the baby pants against the sockets 5 supported by the slides 16 and will hold the parts in contact with each other. The electronic energy is transmitted from the unit 11 to the units 23 and the slide 16 by means of the wires 25 and 26 shown in FIG. 5. The wire 26 is preferably the grounded wire and the bedplate 12 may, if desirable, be made of nonconducting material, although this is not absolutely necessary. The wire 25 connecting the unit 11 and the applying device 23 is the ungrounded potential, and therefore, the units 23 are preferably insulated from the ram 14. Thus, when the material and the fasteners are clamped, a charge of dielectric energy from the unit 11 operates to effectively fuse the flanges 7 of the sockets 5 to one edge of the opening in the baby pants 1. Thereafter the ram moves upwardly again and the edge of the baby pants is removed and the opposite edge placed underneath the ram. During this time the slide 16 has moved to the position shown in FIG. 7 where three studs 4 are presented under the edge of the baby pants and the ram. As the button 24 is again pressed, the same operation of the machine takes place and the three studs 4 are applied, thus completing the application of co-operating sets of studs and sockets to edges of the baby pants. It will, of course, be understood by anyone skilled in the art that during each operation of the slide 16, the pins 27 will operate the escapements 20a by striking arms 28 of the escapement mechanisms as shown in FIG. 7. Furthermore, the pins 29 also carried by the slide 16 will operate arms 30 of the escape mechanisms 20, thus releasing studs 4 as shown in FIG. 6.

Although I have shown one type of applying mechanism and described its essential working parts, I have not gone into all of the details of connecting and operating mechanisms because any suitable such types may be used as will be understood by those skilled in the art. Furthermore, it is believed that it will be obvious to anyone skilled in the art that the same type of application may apply a socket at a time, one stud at a time or it might apply a combination of a stud and socket fed to the same slide so that where only a single stud and socket are necessary on a particular article of commerce, the stud and socket might be applied at the same time and in the proper spaced relation.

While I have illustrated and described a preferred mechanism, a preferred method of operating that mechanism and preferred assemblies of my snap fasteners to particular materials, I do not wish to be limited thereby because the scope of my invention is best defined by the following claims:

I claim:
1. An attaching unit for applying stud and socket parts constituting snap fastener elements to a supporting part comprising at least one hopper for the studs and at least one hopper for the sockets, feeding means for each of said hoppers for dispensing the parts contained therein, sealing apparatus including high frequency electrical energy producing means for sealing the fastener parts to the supporting part, and transfer means for carrying at least one stud and at least one socket alternately from said stud hopper and socket hopper to said sealing apparatus, and means to actuate said sealing apparatus.

2. An attaching unit for applying stud and socket parts constituting snap fastener elements to a supporting part comprising at least one hopper for the studs and at least one hopper for the sockets, said stud hopper and said socket hopper laterally spaced with respect to one another, feeding means for dispensing the parts contained in said hoppers, sealing apparatus including high frequency electrical energy producing means for sealing the fastener parts to the supporting part, said sealing apparatus positioned between said stud hoppers and said socket hoppers, and transfer means for carrying at least one stud and at least one socket alternately from said stud hopper and socket hopper to said sealing apparatus, and means to actuate said sealing apparatus.

3. An attaching unit for applying stud and socket parts constituting snap fastener elements to a supporting part comprising a plurality of hoppers for the studs and a plurality of hoppers for the sockets, said stud hoppers and said socket hoppers laterally spaced with respect to one another, feeding means for dispensing the parts contained in said hoppers, sealing apparatus including high frequency electrical energy producing means for sealing the fastener parts to the supporting part, said sealing apparatus positioned between said stud hoppers and said socket hoppers, and transfer means slidably movable beneath said hoppers in transverse relationship thereto for carrying a plurality of studs and a plurality of sockets alternately from said stud hoppers and socket hoppers to said sealing apparatus, and means to actuate said sealing apparatus.

4. An attaching unit for applying a plurality of fastener elements of a snap fastener part consisting of a stud element and a socket element to a supporting part comprising at least two fastener element supporting means, feeding means for each fastener element, supporting means for dispensing said fastener elements to said supporting part, sealing apparatus including high frequency electrical energy producing means for sealing the fastener elements to the supporting part, and transfer means for carrying said fastener elements from each of said fastener supporting means to said sealing apparatus, and means to actuate said sealing apparatus.

References Cited in the file of this patent

UNITED STATES PATENTS

| | | |
|---|---|---|
| 2,467,315 | Jones | Apr. 12, 1949 |
| 2,633,618 | Moe | Apr. 7, 1953 |
| 2,640,243 | Jones | June 2, 1953 |
| 2,656,541 | Beaver et al. | Oct. 27, 1953 |
| 2,695,651 | Farkas | Nov. 30, 1954 |
| 2,714,413 | Hunter | Aug. 2, 1955 |
| 2,724,884 | Jones | Nov. 29, 1955 |
| 2,745,160 | Jones | May 15, 1956 |
| 2,824,595 | Lehre | Feb. 25, 1958 |
| 2,853,118 | Schnitzius | Sept. 23, 1958 |

FOREIGN PATENTS

| | | |
|---|---|---|
| 629,474 | Great Britain | Sept. 21, 1949 |